June 3, 1952   J. S. D. CUMMING   2,599,435
AIRCRAFT
Filed April 5, 1948   3 Sheets-Sheet 1
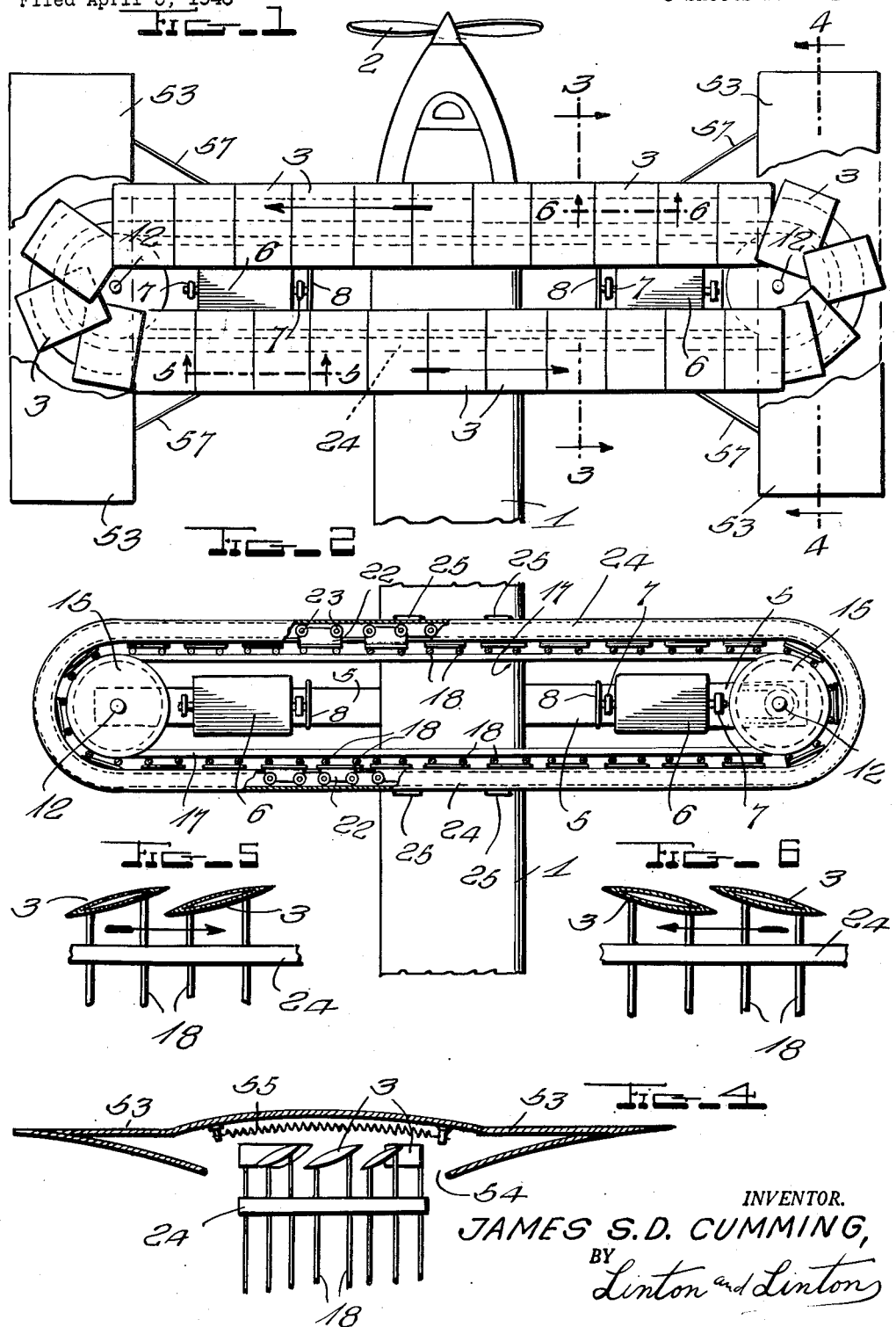
INVENTOR.
JAMES S. D. CUMMING,
BY
Linton and Linton
ATTORNEYS

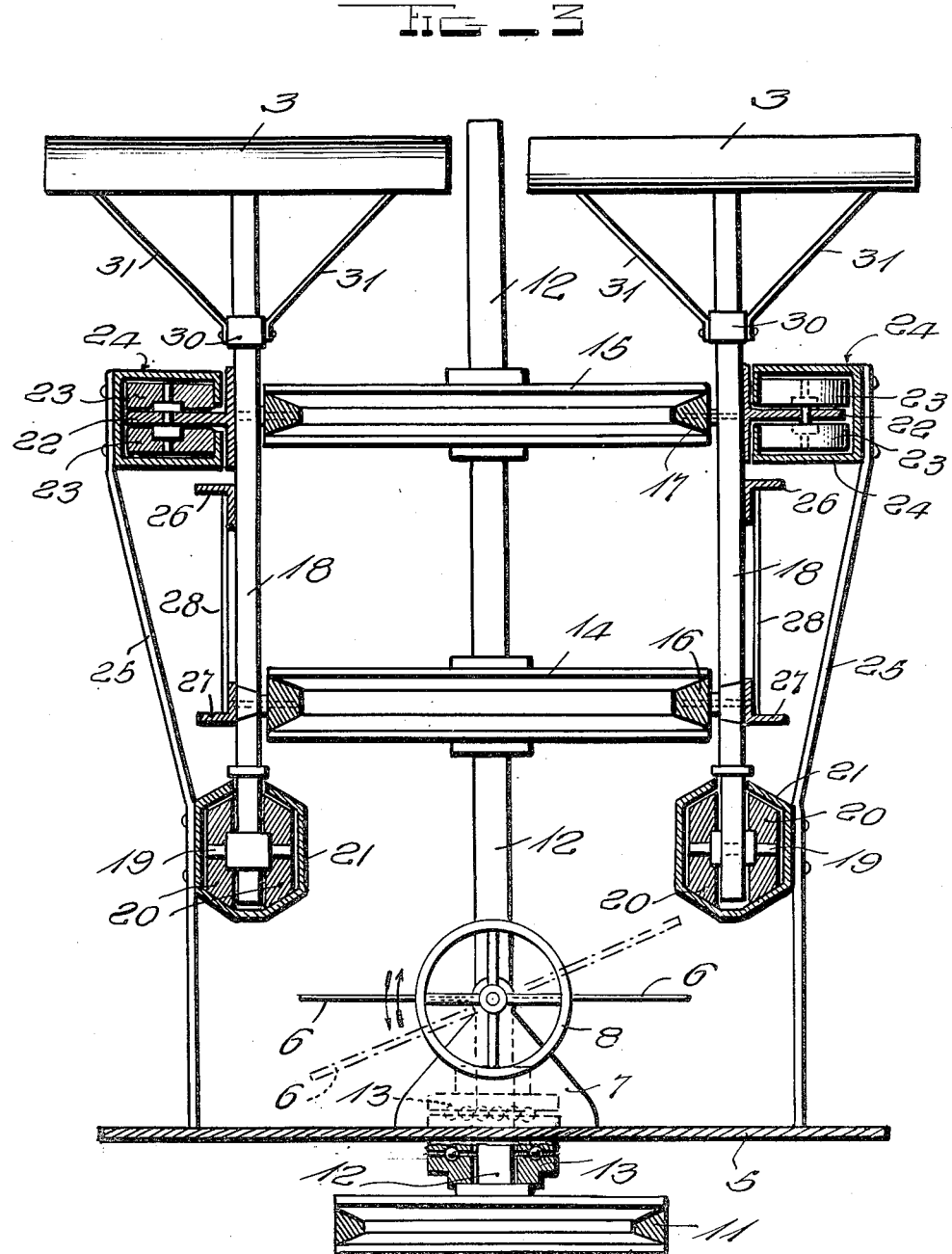

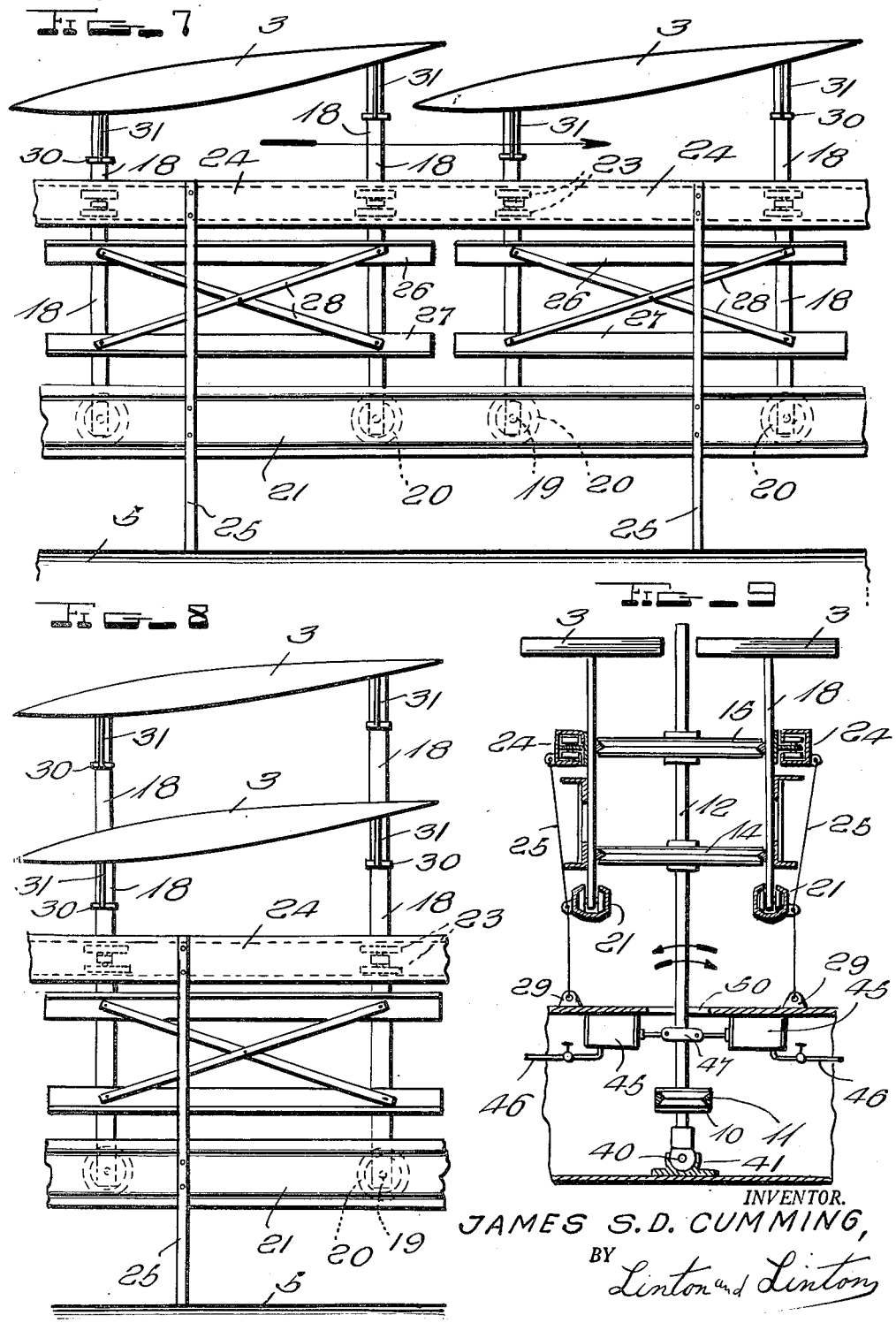

Patented June 3, 1952

2,599,435

UNITED STATES PATENT OFFICE 2,599,435

AIRCRAFT

James S. D. Cumming, Gumwood Farms, Hampton, Va.

Application April 5, 1948, Serial No. 19,145

1 Claim. (Cl. 244—4)

The present invention relates to an improvement in aircraft and is more particularly concerned with means for sustaining aircraft in flight.

It is the principal object of the present invention to provide means for lifting aircraft and which requires a relatively small landing field for both the take-off and landing of a plane.

It is a further and important object of the present invention to provide aerial sustaining means for aircraft which can be attached to the fuselage of either existing planes or new planes and in lieu of or in conjunction with the usual wing or wings employed in the common type of airplane in use at the present time.

Other objects of the invention will be in part referred to and in part obvious from the following detailed description of the acompanying drawings wherein, Figure 1 is a top plan view of an aircraft employing the present aerial sustaining means but with the tail end of the fuselage omitted and with portions of the end covers removed to show the relative position of the airfoils in their movement around each end.

Figure 2 is a detailed top elevation with the airfoils and end covers removed showing the guiding mechanism of the present invention.

Figure 3 is an enlarged detailed cross-sectional view taken on lines 3—3 of Figure 1.

Figure 4 is a longitudinal cross-sectional view of the end cover with the airfoils shown therein.

Figure 5 is a cross-sectional view taken on lines 5—5 of Figure 1 showing the relative position of the airfoils in their movement around the rear portion of the sustaining means.

Figure 6 is a cross-sectional view taken on lines 6—6 of Figure 1 showing the position and direction of movement of the airfoils in their movement around front portion of the sustaining means.

Figure 7 is a detailed view showing two of the airfoils and their supporting and driving members.

Figure 8 is a modified form of the invention similar to Figure 7 but showing the use of biplanes in the aerial sustaining means, and Figure 9 is a detailed view of a further modification of the present invention including means for angularly adjusting and thus changing the incline of the airfoils with reference to the direction of movement of the plane.

Referring now more particularly to the accompanying drawings wherein like and corresponding parts are indicated by similar reference characters, numeral 1 refers to the front portion of the usual airplane fuselage having a propeller 2 mounted on the front end thereof and driven by a motor (not shown) mounted in the fuselage.

Carried above said fuselage 1 is a series of relatively small rectangular planes or airfoils 3 which are supported and driven by means hereinafter described with the leading edge of each plane 3 positioned above the tail edge of the preceding plane 3 and with all planes inclined with the leading edge uppermost. These series of planes 3 are caused to travel laterally of the fuselage with the front portion of the planes traveling also laterally of the fuselage but in a direction opposite to the rear portion of the planes.

Said planes 3 and their connected supporting and driving members are supported upon a streamlined tubular support 5 which extends from the opposite sides of said fuselage. A pair of ailerons are pivotally mounted upon the opposite ends of said support 5 as at 7 with means such as the wheels 8 for pivoting said ailerons through any angle from a horizontal to a substantially vertical position whereupon the lateral stability of the plane can be maintained and also any tendency of the plane to turn due to the rotary movement of the planes 3 can be off-set due to the air moving against said ailerons 6 from the forward and upward movement of the airplane.

At the opposite extreme ends of said support 5 there is mounted a V-pulley 10 around which runs a V-belt 11. Said V-belt 11 is connected to the driving motor in said fuselage by any wellknown means (not shown). Said pulley 10 is fixedly mounted upon a shaft 12 and which shaft 12 is rotatably supported by a thrust bearing 13 through the support 5 with said shaft extending vertically from the top of said support.

Said shaft 12 has a further pair of V-pulleys 14 and 15 fixedly mounted thereon and around which run V-belts 16 and 17 respectively. These V-belts 16 and 17 thus extend around pulleys 14 and 15 at both ends of support 5.

A series of rods 18 are fixedly connected to the outer side of said V-belts 16 and 17 and extend laterally thereof and thus substantially parallel to shaft 12. These rods 18 are evenly spaced apart for having mounted on one end thereof one of said series of airfoils 3 which are connected to each of said rods by a collar 30 and supporting arms 31.

To assure the proper movement and position of each plane 3 there is a pin 19 extending laterally through the lower portion of each rod 18. A pair of tapered rollers 20 are each rotatably mounted upon an opposite end of said pin 19 and are inclosed within a cage 21 which forms a guide track for said rods 18.

Said rods 18 further each have a T-bar 22 extending laterally therefrom and upon which are rotatably mounted a pair of rollers 23 with each roller on an opposite side of said T-bar. These rollers 23 are further enclosed within a cage 24 which also forms a guide tract for the upper portion of said rods 18.

Cages 21 and 24 extend as a continuous guide around said pulleys 14 and 15 and twice across said fuselage 1 and they are supported by a series of uprights 25 mounted upon said support 5.

The outer ends of said series of planes 3 as they pass around pulleys 15 are encased in a streamlined cover 53 which has an opening 54 in the bottom thereof for permitting the movement of the planes 3 therethrough. Each of said covers 53 is connected to support 5 by a pair of arms 57.

Each of planes 3 are connected to a pair of rods 18, as best shown in Figure 7, with the front rod 18 being longer than the rear rod and thus maintaining said plane 3 on an incline. It is also possible to support two or more planes upon each pair of rods 18, as shown in Figure 8, of the drawings where it is necessary to increase the lift ratio of the sustaining means.

The supporting rods 18 for each plane 3 are connected and braced together by a pair of angle irons 26 and 27 which are welded to the outer side of each rod 18. In addition cross braces 28 also interconnect said angle irons 26 and 27 and are in turn welded to the same. The angle irons are so connected with the rods 18 and the braces 28 that each pair of rods 18 are at all time maintained rigidly parallel to one another and vertical relative to the guide tracks 21 and 24. Thus the planes 3 are firmly held in position regardless of the forces exerted thereon by the air flowing thereby when said planes are in motion.

The series of planes 3 are, as clearly indicated in Figures 5, 6 and 7, positioned with the leading edge of each plane 3 above and overlapping the rear edge of the preceding plane. These planes are held in their relative position to one another by the rods 18 and their connection to the endless belts 16 and 17. Thus as the air passes over one of said planes it is immediately contacted by the next plane with the result that the air is continuously being compressed for deriving the maximum lifting power from the series of planes.

In a modified form of the present invention shaft 12 is pivotally supported by a pin 40 extending therethrough and through support 41 mounted within lateral support 5. A pair of hydraulic cylinders 45 further mounted within said support 5 and connected to a fluid supply 46 are mounted on opposite sides of said shaft 12 and have the operating rods thereof pivotally connected to a bearing collar 47 surrounding said shaft 12 whereby the operator of the plane through controls in the fuselage can cause said shaft 12 to pivot by supplying fluid to one or other of the cylinders 45.

An airplane having the present aerial sustaining means mounted thereon and employing the usual propeller 2 for traction and the same motive power as drives propeller 2 will rotate belt 11 and in turn pulleys 10 and shaft 12. Thus pulleys 14 and 15 will drive endless belts 16 and 17 carrying the rods 18 therewith. The guide tracks 21 and 24 will maintain said rods 18 in a substantially vertical position in their movement above the airplane. Thus plane 3 will be caused to move first across the support portion of the fuselage around one pulley 15 back across the fuselage in an opposite direction and then around the other of the pulleys 15 and so on. The angle of incidence of each plane 3 and the airfoil configuration thereof will cause the planes to lift the airplane in a vertical direction and will thus sustain the plane in flight together with the propeller 2. Covers 53 prevent the planes 3 at the opposite ends of support 5 from disturbing the lateral balance of the airplane.

The lifting power of the planes 3 can be increased during the forward movement of the airplane by tilting shaft 12 through said hydraulic cylinders 45 and thus provide each plane 3 with an angle of incidence to the air longitudinally of the airplane as well as laterally thereof. The aircraft can thereby be controlled by the pilot for assuring a quick take-off or for landing within a restricted area by increasing or decreasing the speed of the planes 3 as well as their angle relative to the forward movement of the plane.

To permit the pivoting of shaft 12 in this modified form of the invention it is also necessary to provide for the pivoting of the supports 25 at their point of connection with support 5 and as shown in Figure 9 a pivotal connection for members 25 are shown at 29. Further a slot 50 is also provided in the top of support 5 for permitting the movement of the shaft 12.

Covers 53 also have provided thereunder an electrical resistance coil 54 which when heated by the passage of current therethrough will eliminate any ice which will form upon the planes 3 as they pass under this cover. Current can be supplied from the generator of the plane's motor in a known manner which is not shown. An antifreeze applicator, brush or heating means from the exhaust of the motor can also be employed and is considered the mechanical equivalent of the heating coil for this purpose.

Whereas means for guiding the fuselage of the aircraft other than the ailerons 6 are not shown the usual tail rudder and elevators or propeller may be employed for this purpose but are not shown since they are well known in the art.

It is to be appreciated that the present invention is capable of considerable modification from the structure shown herein and any changes thereto that come within the scope of the appended claim are deemed to be part of the present invention.

I claim:

An improvement in aircraft comprising a fuselage, propelling means for said fuselage, a series of planes, an elongated support extending laterally from said fuselage, pulleys rotatably supported at each end of said support, endless belts extending around said pulleys, means for supporting each plane on a slant relative to said support and connected to and driven by said belts for movement therewith with the uppermost edge of each plane being the leading edge, means for guiding said endless belts longitudinally of said support in two oppositely directed straight parallel lines, means for driving said pulleys, a pair of streamlined covers each supported at an end of said support and covering said planes when moving around said pulleys and means for guiding said aircraft.

JAMES S. D. CUMMING.

REFERENCES CITED

The following references are of record in the file of this patent:

UNITED STATES PATENTS

| Number | Name | Date |
|---|---|---|
| 988,112 | Kerr | Mar. 28, 1911 |
| 2,021,438 | Warner | Nov. 19, 1935 |
| 2,225,525 | Pitcairn | Dec. 17, 1940 |
| 2,344,967 | Bennett | Mar. 28, 1944 |
| 2,414,766 | Platt | Jan. 21, 1947 |
| 2,501,227 | Lewis | Mar. 21, 1950 |

FOREIGN PATENTS

| Number | Country | Date |
|---|---|---|
| 410,848 | France | Mar. 23, 1910 |
| 867,442 | France | July 28, 1941 |